Dec. 14, 1954  G. M. LEWIS  2,696,712
MOUNTING AND COOLING MEANS FOR ENGINE ACCESSORIES
Filed June 19, 1950
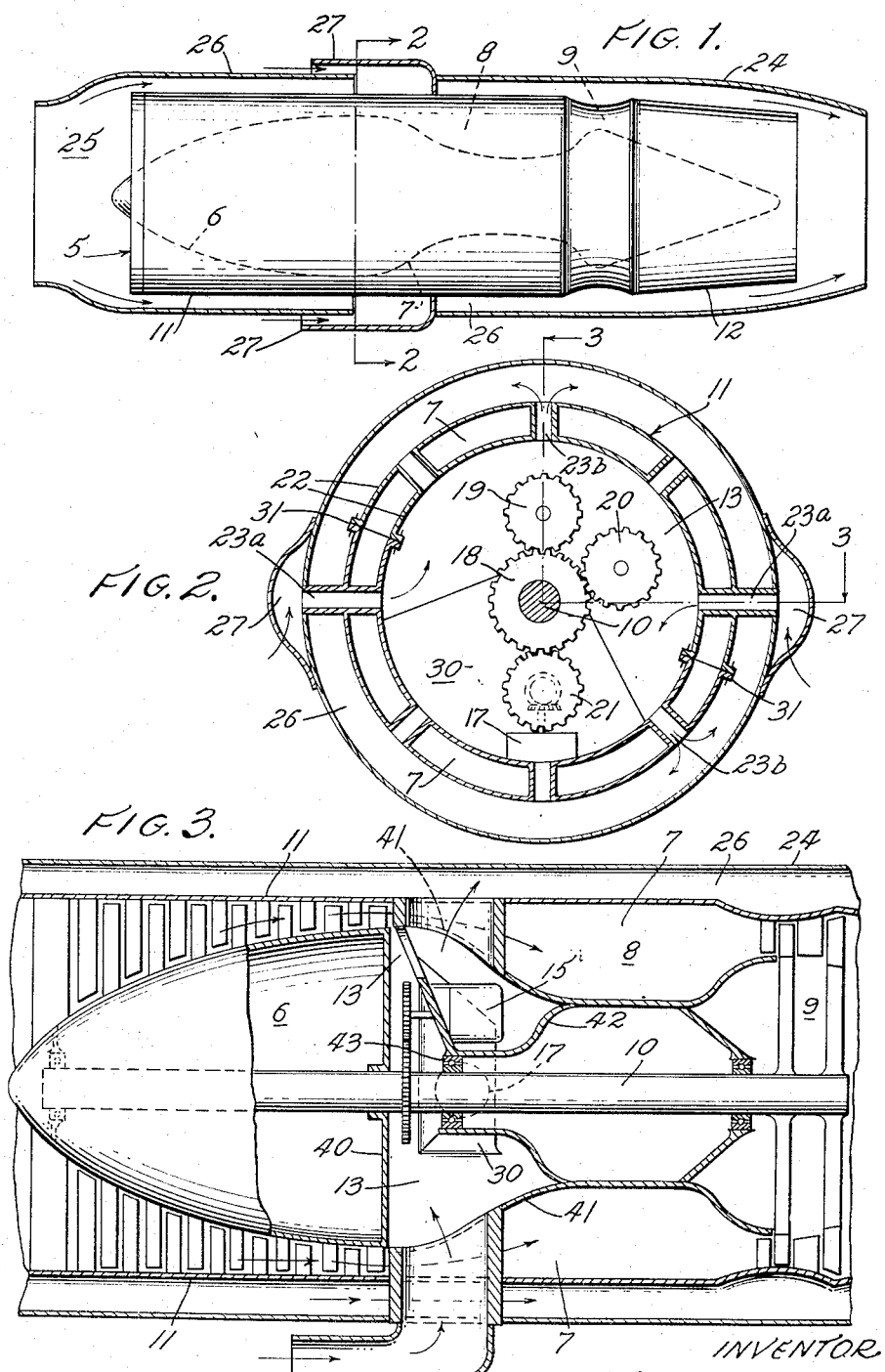
INVENTOR
GORDON M. LEWIS
BY Wilkinson & Mawhinney
ATTORNEY

United States Patent Office 2,696,712
Patented Dec. 14, 1954

2,696,712

MOUNTING AND COOLING MEANS FOR ENGINE ACCESSORIES

Gordon Manns Lewis, Bristol, England, assignor to The Bristol Aeroplane Company Limited, Bristol, England, a British company Application June 19, 1950, Serial No. 168,915

Claims priority, application Great Britain August 16, 1949

4 Claims. (Cl. 60—39.66)

This invention concerns gas turbine engines and has for its object to arrange the engine accessories (oil and fuel pumps and so on) so that the engine may be enclosed throughout its length in a smooth shell of minimum diameter closely fitting the engine, no protuberances whatever being found on the shell to accommodate an engine accessory.

According to the present invention a space bounded on one side by a compressor and around its periphery by a duct or ducts receiving air from the compressor accommodates engine accessories, for example fuel and lubrication pumps.

Previously certain of the engine accessories have been housed inside the deflector bullet at the entry to the compressor. However, the present invention aims to reduce the outside diameter of the engine to a minimum, and for this purpose it is necessary to select a low hub/tip ratio for the inlet end of the compressor, which has the result that the deflector bullet becomes too small to accommodate the engine accessories.

According to a feature of the present invention a gas turbine engine comprises an axial-flow compressor, an annular duct extending from the compressor to the combustion equipment, a turbine driven by the products of combustion from said equipment and driving the compressor by a shaft passing through the annular duct and within the combustion equipment, engine accessories mounted within the space defined by the delivery end of the compressor and within said annular duct and means to drive the accessories from said turbo-compressor shaft.

The nature of the invention will be better understood from a consideration of the drawing accompanying this specification which shows, by way of example only, a practical embodiment of the invention. In the drawing:

Figure 1 is a schematic plan (partly in section) view of a gas turbine engine in accordance with this invention, Figure 2 is a section on the line 2—2 of Figure 1 and to a larger size, and Figure 3 is a section on the line 3—3 of Figure 2.

Referring to the drawing: the engine, which is generally indicated by the numeral 5, comprises an axial-flow compressor 6, an annular air duct 7 to receive the air from the compressor, combustion equipment 8 to receive the air from the annular air duct and a gas turbine 9 driven by the combustion products and driving the compressor through a shaft 10. The engine 5 is enclosed throughout its length in a cylindrical shell 11 of substantially constant diameter. A local reduction in the diameter of the shell 11 takes place where it surrounds the turbine. A pipe 12 carries the gases from the turbine to the rear end of the casing where they are discharged as a jet to drive the engine forwardly. As it is desired to maintain the diameter of the engine as small as possible and completely free from protrusions, engine accessories may not be mounted around the outer surfaces of the engine. Instead, to accommodate the accessories there is provided a space 13 within the annular air duct 7 and between the outlet from the compressor 6 and the combustion equipment 8. As more clearly shown in Figures 2 and 3 the space 13 is defined by diaphragm 40, which forms part of the rotor of compressor 6, the annular wall 41, which constitutes the inner wall of the duct 7, and the wall 42, by which the shaft 10 is in part supported through the agency of bearing 43. As the space 13 is placed where the hub diameter of the compressor 6 is a maximum the space is of relatively large diameter. The wall 41 (Figure 3) isolates the accessories from the engine—more particularly the combustion equipment.

The accessories in space 13 may be the fuel and oil pumps, an engine starter and so on and in the drawing the accessories are indicated at 15 and 17. The accessories are driven through gears 18, 19, 20 and 21 from the shaft 10.

The annular air duct 7 comprises a pair of ring-like walls (the outer wall of which is formed by part of casing 11 and the inner wall of which is the wall 41) which are joined together by hollow radial arms 23a and 23b. The space 13 is ventilated by air passing into the space through the hollow arms 23a and out of the chamber through arms 23b.

The engine 5 is mounted within, and spaced from, an open-ended cylindrical case 24. Air enters the case at one end 25 and passes along the annular chamber 26 between the case and the engine. The exhaust gases leaving the jet pipe 12 have an extractor effect to draw air into the case and between the engine shell and the case. In this way also the boundary layer is drawn off the outside of the case.

Air intakes 27 are provided whereby air from outside the case 24 is directed into the hollow radial arms 23a and vitiated air is discharged from arms 23b to the space 26.

The air duct 7 is in two parts joined together at 31 so that the parts are removable to give access to the engine accessories.

The space 13 is subdivided into a compartment 30 (Figures 2 and 3) which constitutes the engine sump and into which lubricating oil is returned from the engine. The pump 17 is within compartment 30 and is provided to deliver oil from the sump to the engine.

I claim:

1. A gas turbine engine comprising a compressor, a turbine spaced axially of the compressor, combustion equipment in which fuel is burnt, an annular duct to convey air from the compressor to said equipment, said equipment and annular duct being disposed axially between the compressor and the turbine which is driven by the products of combustion from said equipment, a shaft drivingly connecting the turbine with the compressor and passing through the space surrounded by said annular duct, engine accessories accommodated within the space bounded on one side by said compressor and around its periphery by said annular duct, means to drive the accessories from said turbo-compressor shaft, a cylindrical shell enclosing the engine, and hollow arms extending across the annular duct and placing said space in communication with the outside of the shell.

2. A gas turbine engine as claimed in claim 1 in which the engine shell is within and spaced from a cylindrical case and air is drawn along the annular chamber between the shell and case by discharge of the exhaust gases from the engine, at least one of said hollow arms communicating with said chamber through which air is withdrawn from the accessory space.

3. A gas turbine engine as claimed in claim 2 wherein air is directed into the accessory space by at least one air intake which is on the outside of the cylindrical case and communicates or communicate each with a hollow arm.

4. A gas turbine engine comprising a compressor, combustion equipment spaced axially of the compressor and encompassing an interior volume, an annular duct to convey air from the compressor to said equipment, means forming a space between said volume and said compressor, said means comprising said annular duct bounding the periphery of the space, said compressor bounding one side of the space and an isolating member bounding the other side of the space adjacent said volume, and engine accessories accommodated within said space.

(References on following page)

References Cited in the file of this patent

UNITED STATES PATENTS

| Number | Name | Date |
|---|---|---|
| 2,402,377 | Davenport | June 18, 1946 |
| 2,435,836 | Johnson | Feb. 10, 1948 |
| 2,482,505 | Pierce | Sept. 20, 1949 |
| 2,519,130 | Griffith | Aug. 15, 1950 |
| 2,529,973 | Sédille et al. | Nov. 14, 1950 |
| 2,578,481 | Lombard | Dec. 11, 1951 |
| 2,579,049 | Price | Dec. 18, 1951 |
| 2,592,938 | McNaught | Apr. 15, 1952 |
| 2,598,544 | Holman et al. | May 27, 1952 |
| 2,625,794 | Williams | Jan. 20, 1953 |

FOREIGN PATENTS

| Number | Country | Date |
|---|---|---|
| 614,138 | Great Britain | Dec. 9, 1948 |

OTHER REFERENCES

Machine Design, July 1944, page 97.